Mar. 6, 1923.
R. M. ZACHARIAS.
RIM.
FILED JAN. 22, 1920.
1,447,199.
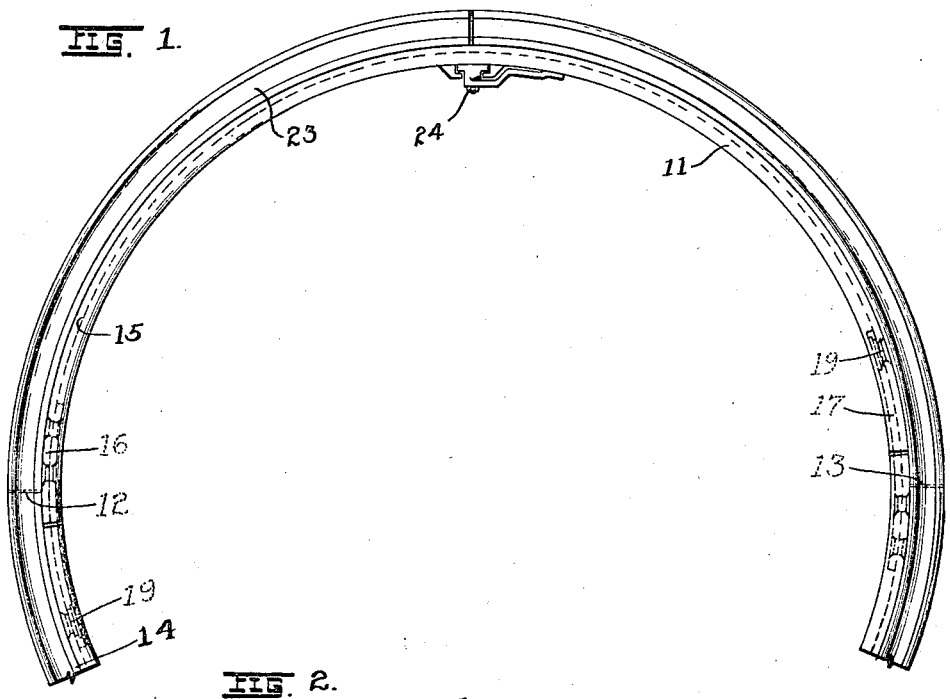
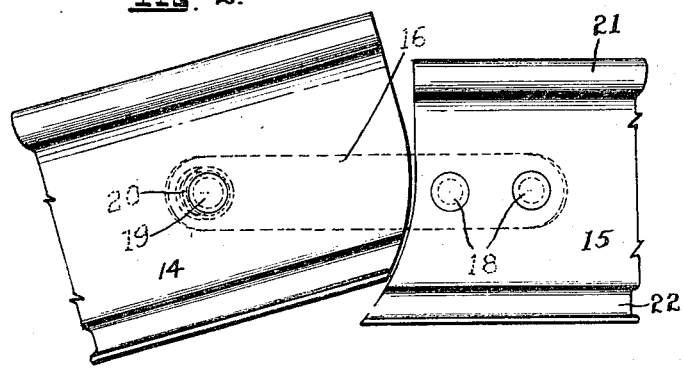
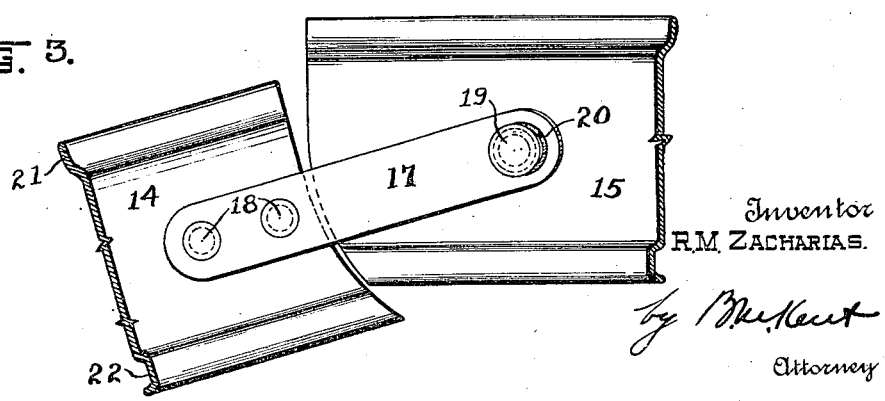
Inventor
R. M. Zacharias.
Attorney Patented Mar. 6, 1923.

1,447,199

UNITED STATES PATENT OFFICE.

ROBERT M. ZACHARIAS, OF CLEVELAND, OHIO, ASSIGNOR TO THE STANDARD PARTS COMPANY, OF CLEVELAND, OHIO, A CORPORATION OF OHIO.

RIM.

Application filed January 22, 1920. Serial No. 353,134.

*To all whom it may concern:*

Be it known that I, ROBERT M. ZACHARIAS, a citizen of the United States, and a resident of Cleveland, county of Cuyahoga, State of Ohio, have invented certain new and useful Improvements in Rims; of which the following is a specification.

This invention relates to vehicle wheel rims and more particularly to demountable rims composed of complementary arcuate sections which are hinged together so as to be relatively movable to a position in which they no longer lie in the same plane, to facilitate the removal or replacing of a tire thereon. One of the objects of the invention is the provision of a rim of this type which may be economically manufactured and in which the sections are so hinged together as to faciltate the use of the rim with fixed rims of standardized type. Another object of the invention is the provision of a rim of this type which will have no tendency to collapse under the radial pressure of an inflated tire thereon and which is so constructed that the ends of the sections thereof will be held in proper alinement by the means which hold the rim on the fixed rim of the wheel.

Still further objects of the invention and the features of novelty will be apparent from the following specification, when taken in connection with the accompanying drawings, in which:—

Figure 1 is a fragmentary side elevation of a wheel rim embodying my invention;

Fig. 2 is a fragmentary plan view of the hinged ends of the rim sections at one of the points at which the rim is transversely split, the view being taken from the outside of the rim; and Fig. 3 is a fragmentary plan view similar to Fig. 2 but taken from the inside of the rim.

In the drawings, 11 indicates a vehicle wheel rim which is transplit at diametrically opposite points 12 and 13 to form a pair of complementary arcuate sections 14 and 15. The lines along which the splits are formed are preferably in part straight and in part curved and the curved portions thereof extend circumferentially in the same direction from the straight portions, so that the sections 14 and 15 are identical, each being convex at one end and concave at the other end, as best shown in Figs. 2 and 3. To the concave ends of the sections, the hinge plates 16 and 17 are rigidly secured, by rivets 18, and these plates underlie the ends of the sections and are each adapted to extend across a split in the rim and be pivotally secured to the adjacent convex rim section end. It is preferable that the pivotal axis be located substantially in the central plane of rotation of the rim, as shown in the drawings, but it will be understood that such axis may be located adjacent one edge of the rim, if it is so desired. The rim ends are preferably connected to the hinge plates 16 and 17, by pivots 19, which are rigidly mounted in the rim end and cooperate with elongated openings 20 in the hinge plates which receive the head of the pivot in such manner as to permit slight relative circumferential motion of the ends of the sections when they are moved to the position shown in Figs. 2 and 3.

I have shown the rim 11 as provided with an integral flange 21 at one end thereof, and provided adjacent its other edge with a channel which is adapted to receive a detachable side ring 23 which is removably seated therein and provided with locking means, indicated generally at 24, by which it may be secured in position. It will be understood, however, that any suitable means of holding the detachable side ring in place may be utilized and that the rim may be provided with an integral flange at each edge, if it is so desired, the present invention being particularly concerned with the means for connecting the ends of the rim sections.

When it is desired to remove a tire from the rim, the detachable side ring 23 is first removed, after which the sections 14 and 15 may be swung relatively about the diametrical axis determined by the pivots 19—19. The curved portions of the lines about which the rim is transplit are preferably slightly eccentric to the center of the pivots 19, so that as the sections are thus swung, the pivots 19 can move slightly in the elongated openings 20 in the hinge plates and the ends of the rim sections can move slightly together circumferentially. There will thus be no tendency to stretch that bead of the tire adjacent the integral flange 21.

By thus forming the rim sections with curved portions extending in the same circumferential direction from the straight portions, it will be understood that the rim can be transplit at both points by the same die, and the sections, together with their hinge plates, will be identical and, therefore, interchangeable. It will also be evident that since the pivotal axis about which the sections swing is diametrical of the rim there will be no tendency to shear the heads of the pivots 19 when the sections are so swung and the splits will be so located that diametrically opposite clamps, by which the rim is secured on the wheel, will cooperate with the ends of the sections of the splits, to hold them in alinement.

While I have illustrated and described one form of construction embodying my invention, it will be understood that changes may be made in the details of construction, without departing from the spirit of my invention which is defined in the following claims.

Having thus described my invention, what I claim is:—

1. As an article of manufacture, a vehicle wheel rim divided transversely at two points to form complementary arcuate sections, said sections being hinged together at their ends about an axis which intersects one end of each of said sections.

2. As an article of manufacture, a vehicle wheel rim divided transversely at two points to form complementary arcuate sections, said sections being hinged together at their ends, each of the lines of division comprising a straight portion and a curved portion, said curved portions extending in the same circumferential direction from the straight portions.

3. In a vehicle wheel rim of the class described, the combination of a pair of complementary arcuate rim sections each having a convex end and a concave end, and plates each rigidly secured to one of the concave section ends and having a lost motion pivotal connection with the adjacent convex section end.

In testimony whereof I affix my signature.

ROBERT M. ZACHARIAS.